Sept. 26, 1939.  A. J. TOWNSEND  2,173,867
LOCOMOTIVE AND TRUCK STRUCTURE
Filed July 22, 1937   2 Sheets-Sheet 1
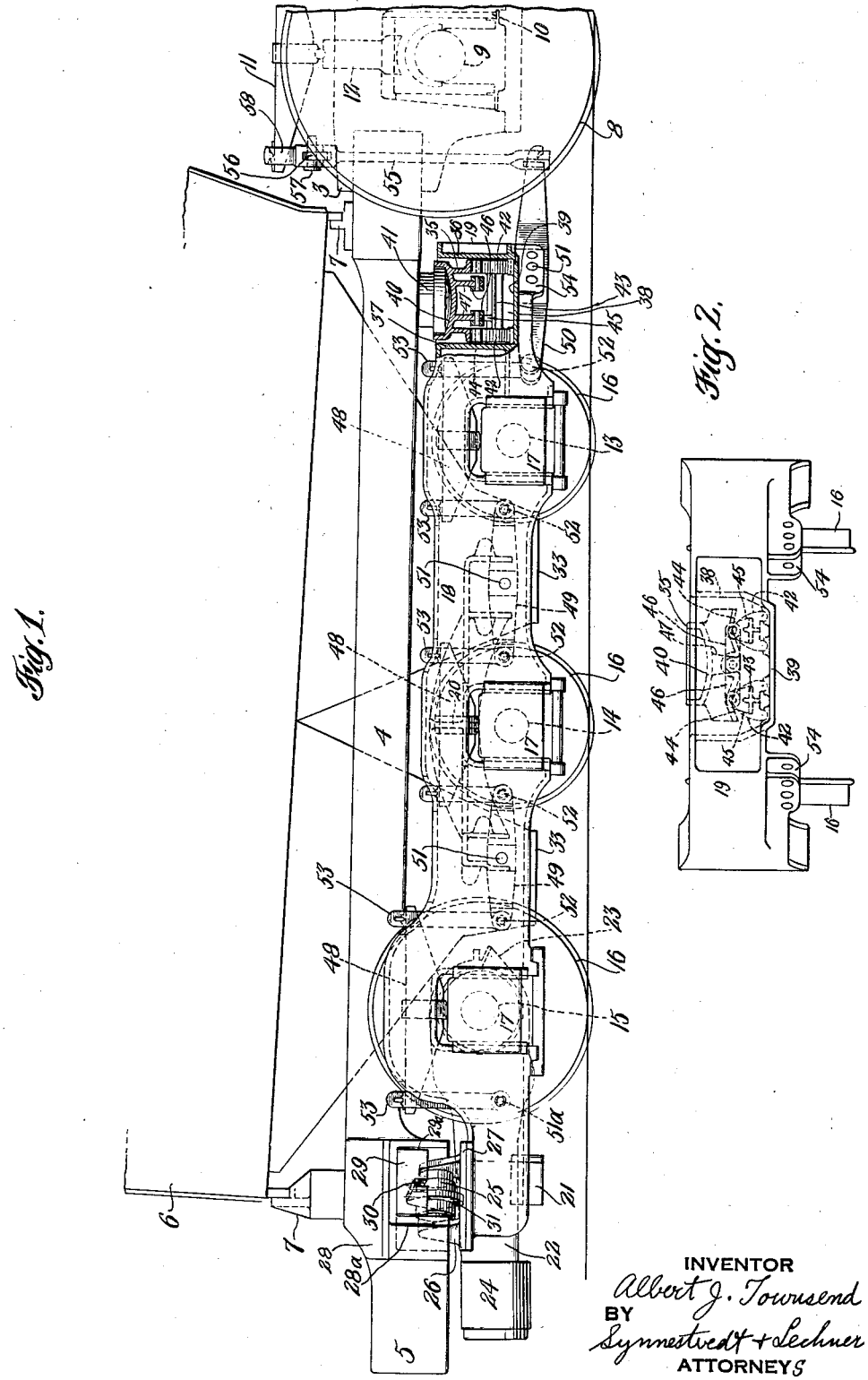
INVENTOR
Albert J. Townsend
BY
Synnestvedt + Lechner
ATTORNEYS Sept. 26, 1939. A. J. TOWNSEND 2,173,867
LOCOMOTIVE AND TRUCK STRUCTURE
Filed July 22, 1937 2 Sheets-Sheet 2

INVENTOR
Albert J. Townsend
BY
Synnestvedt + Lechner
ATTORNEYS

Patented Sept. 26, 1939

2,173,867

UNITED STATES PATENT OFFICE 2,173,867

LOCOMOTIVE AND TRUCK STRUCTURE

Albert J. Townsend, Lima, Ohio

Application July 22, 1937, Serial No. 154,940

16 Claims. (Cl. 105—174)

This invention relates to locomotive and truck structure, or the like, and more particularly to railway trucks having a plurality of axles and to the cooperative relation of the truck structure to the vehicle superstructure and running gear; and in its more specific aspects the invention lies in the field of locomotive trailer trucks of the type having at least two and preferably more than two axles. Before considering the objects, advantages, and structural features of the present improvements in detail, it will be helpful to consider briefly a few of the problems encountered in this art.

In railway vehicles of considerable length and weight, such as modern locomotives, the tracking and guiding functions devolving upon the trucks impose very severe loads thereon, and especially upon the wheels and their flanges. The riding of the locomotive, and its guidance into and out of curved tracks, particularly at high speeds, would be substantially improved by securing from each wheel flange its full share of these functions and/or by adding to the number of axles and wheels in the truck, but such desirable results have been difficult to secure, for several reasons, notably lack of space or clearance and, more especially in the case of radial trailer trucks, the inability to provide ample flexibility for curving without imposing extreme loads on the wheel flanges or else providing excessive freedom for lateral-motion of at least the front axle or more than one axle of the truck frame relative to the truck frame. It has even been proposed to employ blind tires on an axle of multi-axled trucks to facilitate negotiating the curves, but such construction obviously defeats one of the very ends in view, i. e. the division and improved distribution of the lateral thrusts among a larger number of wheel flanges. The practice heretofore employed, namely: providing a large degree of lateral-motion of the inner or leading axle of the truck, which as above stated has been done to accommodate curves, results in largely destroying the guiding function of said axle so that, especially on tangent track, the forward axle and wheels of the truck hammer back and forth in the truck frame, with resultant exessive strains and wear upon the journal boxes, liners, and other truck parts, without serving any useful purpose.

Furthermore, with increase in length of vehicles, especially locomotives, and also with the coming of longer fire-boxes and longer trucks thereunder, the problems of weight distribution or equalization among the axles, maintenance of rigidity of superstructure in spite of heavy draft loads which are often transmitted considerably to one side when passing along curves, and other allied problems, have been substantially increased.

In general my invention contemplates overcoming or minimizing the above-mentioned difficulties. More particularly, the invention contemplates the provision of truck structure in which a plurality of, preferably three, or even more, axles are journalled, and wherein even though little or no lateral play be accorded to at least the innermost axle, such as the front axle of a trailing truck, the truck readily follows the track curvature and the tracking and guiding loads are nicely divided among the several wheels and their flanges, and preferably the accomplishment of such action by providing a truck pivot or swiveling bearing longitudinally offset from the center of the truck wheel-base, and means providing for bodily lateral motion of the truck or at least the truck frame at the pivot point; the preferred embodiment involving the transmission of weight to the truck through three points of support, two of which are adjacent the end of the truck opposite to the pivot point and the third of which is preferably constituted by the pivot means, weight-resisted lateral-motion being preferably provided at each point of support, and some rocking movement of the truck frame being also accommodated adjacent the truck pivot.

In conjunction with one or more of the above features, the invention further contemplates a weight-transmitting equalizer system between the truck and the axles of the main frame, and particularly such a system receiving weight from the truck frame and bearing upon the truck and main frame axles, such arrangement being especially useful in equalizing irregularities which may arise due to the motion permitted to the truck frame by the weight-controlled lateral-motion supporting elements for the superstructure, which preferably are of the rocker type or of the roller and inclined pad type. Still further, the invention has in view the arrangement of the framing, pivot mechanism, weight-receiving bearings, equalizer mechanism, and axles, of a multi-axled truck, in such manner as to leave ample room for and to cooperate best with the booster motor for the truck and the ash pan parts beneath the superimposed fire-box.

How the foregoing objects and advantages, together with such others as may be incident to the invention, are attained, will be evident from the following description, taken together with the accompanying drawings, in which:

Figure 1 is a fragmentary side elevation of the rear end of a locomotive illustrating the preferred embodiment of the truck of the present invention, the pivot mechanism of the truck being shown in section;

Figure 2 is a front end view of the truck per se, omitting the equalizers; and

Figure 3:
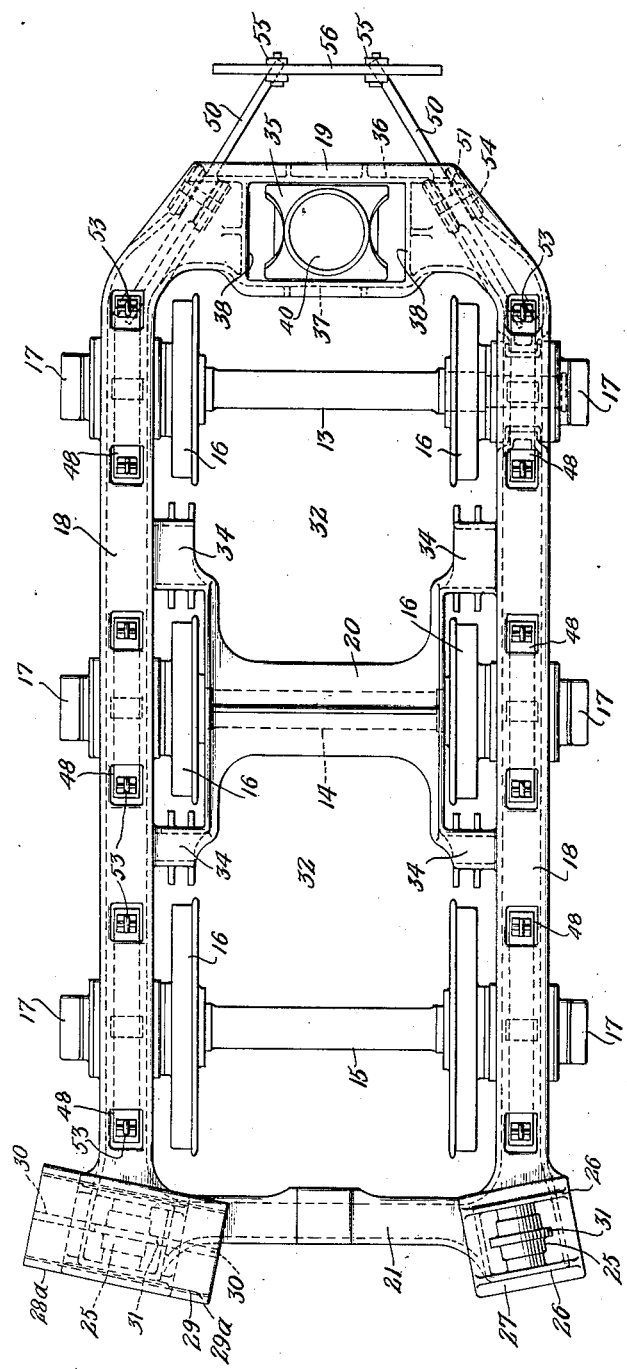
Figure 3 is a top plan view of the truck, omitting the main frame of the vehicle, the ash pan structure, the booster motor, and other parts.

The locomotive, comprising a main frame, the rear end of which is indicated at 3, a rearward extension 4 thereof (sometimes called a cradle), a draft gear pocket 5, a fire-box 6 and furnace bearers 7, has a plurality of pairs of driving wheels, one of which is indicated at 8, with axles 9 journalled in driving boxes for vertical movement in the pedestals 10, weight of the frame and of the rest of the superstructure being transmitted to the axles as by springs 11 seated on saddles 12, one of the rear driver springs being the only one shown in the drawings, although it will be readily understood by those skilled in this art that the forward ends of the rearmost springs 11 are normally coupled by links to equalizer bars pivoted on the main frame, said bars in turn being coupled to the other springs forwardly thereof.

The truck illustrated is of the six-wheel type, having three axles, 13, 14 and 15, with wheels 16, said axles being journalled in any desired manner in journal boxes 17 which are vertically movable in pedestal ways formed in the side members 18 of the truck frame.

The truck frame is completed by three transoms, 19 at the front end, 20 over the middle axle, and 21 at the rear end; the whole frame being cast as one piece if desired.

The last of these transoms serves also as a support for the booster motor 22, of which the bedplate or casing 23 has its forward end journalled on the axle 15 which is adapted to be driven by the booster motor the cylinders of which are shown at 24. Transom 21 further serves to strengthen the side members of the frame at its points of connection thereto, whereat are located weight-receiving bearings in the form of rollers 25 mounted in brackets 26 formed on the supporting plate 27 which is secured to the truck frame. These two rear side bearing rollers preferably have their axes of rotation converging forwardly toward the central point of the truck pivot hereinafter to be described. The superstructure, preferably by means of the bracket 28a of cross beam 28 of the frame extension 4, bears upon the rollers 25 through the intermediation of pads 29 having inverted V-shaped underfaces for riding on the rollers, thus tending to center the truck by the weight of the superstructure. The pads have a slight clearance 29a for accommodating longitudinal sliding relative to the frame, and may be provided with slot means 30 for engagement with the flange or rib 31 on each of the rollers, so that the slight longitudinal play of the truck carries the rollers and other parts with it.

The middle transom 20 of the truck is chiefly of narrow construction, whereby to leave ample clearance spaces 32 between axles 13 and 14 and between axles 14 and 15 for the downwardly extending hoppers 33 of the ash pan mechanism seen in Figure 1, but this transom widens out adjacent the wheels to embrace the same, thus forming at each side two parts 34, 34, preferably formed integrally with the transom and the frame proper, and serving also to carry brackets for the support of brake rigging or the like.

The forwardmost transom 19 (also an integral part of the frame) has a substantial central recess adapted to receive the lateral-motion bolster 35, said recess being defined by front and rear walls 36, 37, side walls 38, and bottom wall 39 (as best seen in Figure 3).

The bolster 35, which carries a concave center plate or bearing seat 40 adapted not only for pivotation but also for slight rocking relative to the center pin 41 which transmits weight from the main frame, is mounted for weight-resisted, i. e. weight-restored, lateral-motion within the transom recess, by any suitable means such as the rockers 42 which are seated in the bottom of the transom. Each rocker may comprise a couple of rocker heads connected by a web 43, and positioned with respect to the inclined rocker engaging surfaces 44, each by means of an arm 45 and a link 46 pivoted thereto and to a fixed flange or similar member 47 of the bolster.

It will be obvious from the foregoing, especially by reference to Figures 1 and 2, that the pivot assembly provides a single structural pivot axis (formed by parts 40 and 41) which remains at a fixed point with respect to the main frame of the vehicle during operation, while the rocker-mounted bolster 35 accommodates lateral motion of the truck frame adjacent the pivot. The profile of the rockers 42 and engaging surfaces 44 (as best shown in Figure 2) will be seen to be such that an appreciable relative vertical displacement between the main frame and truck frame occurs conjointly with bodily lateral motion of the truck, whereby, in conjunction with the weight-transmitting pivot device, a relatively powerful centering effect is imposed upon the truck frame at its pivoted end.

In its essentials, the truck is completed by the spring suspension and equalizing system, comprising springs 48, each seated on an axle box 17, and equalizer bars 49, 49, and 50, each pivoted intermediate its ends upon the truck frame, as by pivots 51, said equalizers having pivotal connections 52 with the links or hangers 53 which are suspended from the ends of the springs. The rearmost link 53 is pivoted to the truck frame at 51a.

It will be observed that the side frame members 18 of the truck are made of box section or other hollow construction to receive the springs, the equalizer bars, and the links. Each side of the truck thus has an equalizing system, the forward end of which comprises the equalizer bar 50 the pivot 51 of which may be alternatively secured in any of a plurality of holes in the bracket members 54 extending downwardly from the bottom of the forward transom 19 for adjustment of the weight distribution. The forward ends of the two equalizer bars 50 connect with the spring and equalizer system of the driving wheels, by means of the vertical hangers 55, the upper ends of which are pivotally coupled to a transverse equalizer bar 56 short of the ends thereof, the outer ends of this cross equalizer being pivoted at 57 to short links 58 depending from the rear ends of the rearmost driver springs 11.

It will now be evident that, as the locomotive enters upon a curved track, not only will the rear end of the truck swing laterally, tending to pivot about the axis of the pivot assembly 40, 41, but further that the front end of the truck will also have bodily lateral movement relative to the pivot to such degree as is demanded by the degree of curvature. In other words, the independent weight-restored lateral-motion mechanisms at the two ends can accommodate lateral motion to different degrees, as required, with the result that, instead of requiring a large amount of free play or lateral motion of the leading axle or axles of the truck as is the case with known types of radial trailer trucks, the entire truck frame and thus the wheel-base of the truck independently of the wheel-base of the main drivers, can take that lateral position (relative to the longitudinal axis of the superstructure) which is best suited to the particular curve, and with the further result that the tracking and guiding functions of the truck will be better divided between the flanges of the several wheels. Equivalent guiding and tracking advantages are secured when operating on straight track, the excessive lateral hammerings of the leading axle of the truck being entirely avoided.

In addition to equalizing the load on the various axles due to irregularities in the track, the flexible equalizing system with its interconnection between the truck and the main driving axles, accommodates and also distributes inequalities due to the rocking of the truck frame incident to the action of the weight-receiving rockers and rollers during lateral movement thereof.

It will now further be evident that though the truck is given the capability of lateral as well as pivotal motion yet the pivotal mounting is not in such position as to interfere with the clearance for ash pan mechanism, the pivot mechanism being toward the front end of the truck, and the two other points of weight support as well as the booster motor being located toward the rear of the truck, back of the rear axle.

These advantages, together with others mentioned at the beginning of this specification, are secured by a construction which is relatively simple, and readily manufactured, installed, and maintained.

I claim:

1. In a locomotive with its main frame and axles journalled therein, a radial truck comprising a frame and a plurality of axles therefor, weight-carrying bearing means adjacent one end of the truck frame, and adjacent the other end a truck pivot adapted to cooperate with the main frame at a fixed point and having a weight-restored lateral-motion mounting in the truck frame.

2. In a locomotive with its main frame and axles journalled therein, a radial truck comprising a frame and a plurality of axles therefor, weight-carrying bearing means adjacent one end of the truck frame, and adjacent the other end a weight-transmitting truck pivot adapted to cooperate with the main frame at a fixed point and having a weight-restored lateral-motion mounting in the truck frame.

3. In a locomotive with its main frame and axles journalled therein, a radial truck comprising a frame and a plurality of axles therefor, weight-carrying bearing means adjacent one end of the truck frame, and adjacent the other end a truck pivot adapted to cooperate with the main frame at a fixed point and having a weight-restored lateral-motion mounting in the truck frame, and an equalizer system receiving weight from the truck frame and bearing upon truck and main frame axles.

4. In a locomotive with its main frame and axles journalled therein, a radial truck comprising a frame and a plurality of axles therefor, weight-carrying bearing means adjacent one end of the truck frame, and adjacent the other end a weight-transmitting truck pivot adapted to cooperate with the main frame at a fixed point and having a weight-restored lateral-motion mounting in the truck frame, and an equalizer system receiving weight from the truck frame and bearing upon truck and main frame axles.

5. In a locomotive with its main frame and axles journalled therein, a radial truck comprising a frame and a plurality of axles therefor, weight-carrying bearing means adjacent one end of the truck frame, and adjacent the other end a truck pivot adapted to cooperate with the main frame at a fixed point and having a weight-restored lateral-motion mounting in the truck frame, and a weight-transmitting equalizer system between the truck and the axles of the main frame.

6. A railway vehicle truck frame having side members each with pedestals for a plurality of axles, a pair of weight-receiving bearing support means adjacent one end of the frame and a transom adjacent the other end of the frame beyond the wheel-base thereof and recessed to receive a lateral-motion bolster.

7. A locomotive truck having a frame with a plurality of wheeled axles journaled therein, weight-receiving bearing support means adjacent one end of the truck frame, a pivot assembly located adjacent the opposite end of the truck frame beyond the wheel-base thereof for pivoting the truck to the locomotive and means associated with said pivot assembly accommodating conjoint bodily lateral and vertical motion of the truck frame relative to the locomotive at the pivot.

8. A locomotive trailing truck comprising a frame with a plurality of wheeled axles journaled therein, a transom adjacent the rear end of the truck frame having means for supporting weight, a transom adjacent the front end of the truck frame having means for supporting weight, a bolster carrying a truck pivot, means mounting said bolster in said front transom for lateral motion relative thereto, and intermediate transom means for the truck frame located over an intermediate axle between the front and rear axles and separated substantially from both of the latter axles to provide clearance for ash pan means.

9. Locomotive and truck structure comprising a truck frame, a pivot device located toward one end of the truck frame, a plurality of axles journalled in the truck frame between said pivot device and the opposite end of said frame, said pivot device providing only one structural pivot axis about which the pivotal movements of the truck take place, which pivot axis is located at a point which remains fixed relative to the locomotive proper during operation, and toward each end of the truck a mechanism providing for lateral motion of the truck frame including centering means receiving weight from the locomotive proper and acting to center said truck frame laterally under the influence of the superimposed weight.

10. Locomotive and truck structure comprising a truck frame, a pivot device located toward one end of the truck frame, a plurality of axles journalled in the truck frame between said pivot device and the opposite end of said frame, said pivot device providing only one structural pivot axis about which the pivotal movements of the truck take place, which pivot axis is located at a point which remains fixed relative to the locomotive proper during operation, and toward each end of the truck a mechanism providing for lateral motion of the truck frame including centering means receiving weight from the locomotive proper and acting to center said truck frame laterally under the influence of the superimposed weight, said weight-actuated lateral centering means adjacent the pivoted end of the truck being of a type providing greater resistance to lateral motion than the centering means adjacent the opposite end of the truck.

11. Locomotive and truck structure comprising a truck frame, a pivot device located toward one end of the truck frame, a plurality of axles journalled in the truck frame between said pivot device and the opposite end of said frame, said pivot device providing only one structural pivot axis about which the pivotal movements of the truck take place, which pivot axis is located at a point which remains fixed relative to the locomotive proper during operation, and toward each end of the truck a mechanism providing for lateral motion of the truck frame including centering means receiving weight from the locomotive proper and acting to center said truck frame laterally under the influence of the superimposed weight, said pivot device constituting a weight-transmitting element of said centering means.

12. In a locomotive, a radial trailer truck having its pivot constituted by a single pivot axis located forward of the truck wheel-base, a device providing for lateral motion of the truck at said pivot, and means imposing weight of the locomotive to center said truck at said pivot.

13. In a locomotive, a radial trailer truck having its pivot constituted by a single pivot axis located forward of the truck center, a plurality of axles in said truck rearward of said pivot axis, a device providing for lateral motion of the truck at said pivot, and means imposing weight of the locomotive to center said truck at said pivot.

14. A railway truck, comprising frame and axle means including a plurality of wheeled axles, and having three general points of support for superstructure, two toward one end of the truck and one toward the opposite end, means adjacent the latter point of support providing weight-restored bodily lateral movement of the truck frame and axle means relative to the superstructure, and said first two points of support including means providing weight-restored lateral swinging and means providing limited longitudinal movement of the truck frame thereat, whereby the truck frame and axle means may swing as a whole toward one side or the other of the longitudinal axis of the superstructure.

15. A pivoted locomotive truck having a plurality of axles, said truck being adapted to receive weight from the locomotive proper at points adjacent each end of the truck wheelbase, and mechanism providing for lateral motion of either end of the truck independently of the opposite end to an appreciable degree, said mechanism including means adjacent each end effecting a centering action under the influence of imposed weight.

16. In a locomotive, a truck comprising a frame and a plurality of axles, and independent mechanisms adjacent each end of the truck for transmitting weight of the locomotive to the truck frame, said mechanism adjacent each end of the truck comprising means acting under the influence of the superimposed weight to laterally center the corresponding end of the truck with relation to the locomotive substantially independently of the action of the means at the opposite end.

ALBERT J. TOWNSEND.